United States Patent Office 2,841,536
Patented July 1, 1958

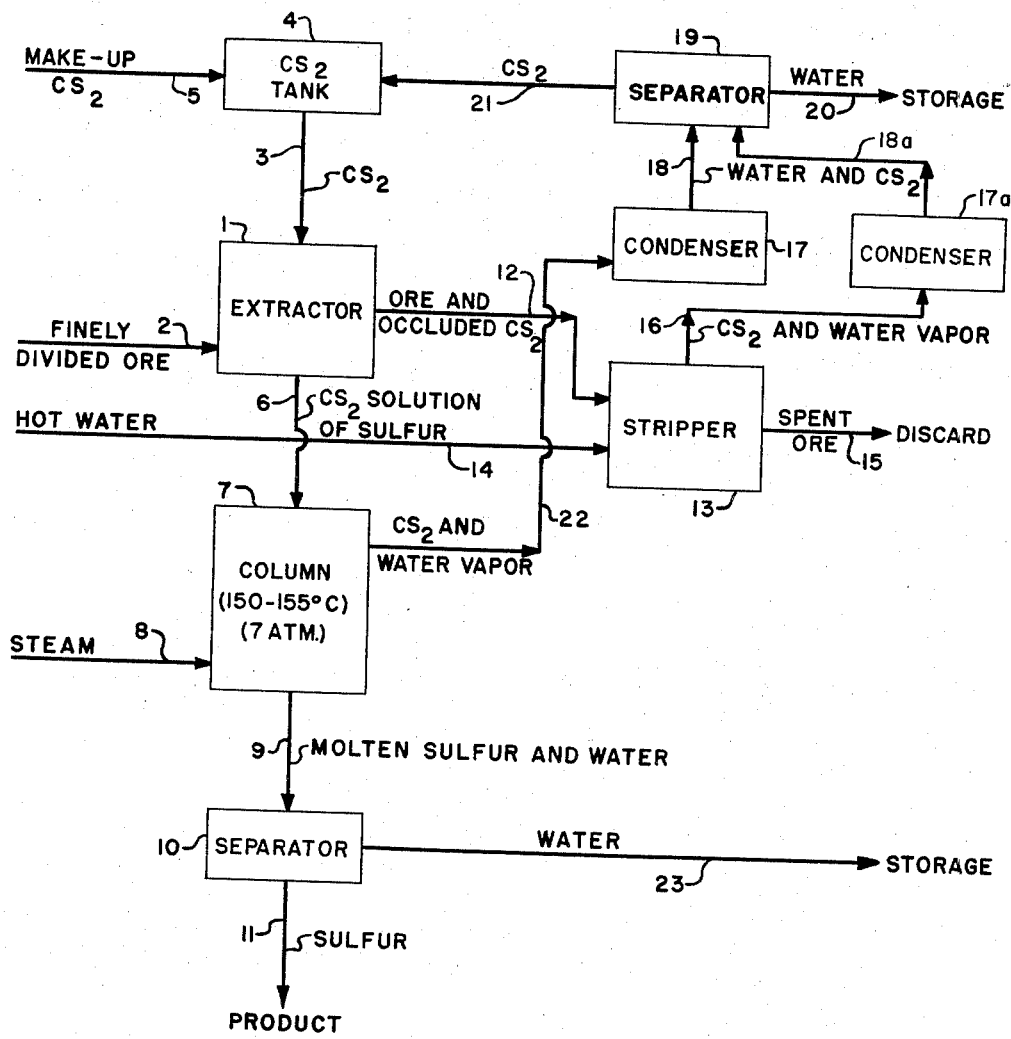

2,841,536

PROCESS FOR RECOVERY OF SULFUR FROM ELEMENTAL-SULFUR BEARING ORE

Robert B. Egbert, Roslyn Heights, N. Y., assignor to Chempatents, Inc., New York, N. Y., a corporation of Delaware Application January 5, 1953, Serial No. 329,670

6 Claims. (Cl. 202—46)

This invention relates to processes for recovering elemental sulfur from carbon disulfide solutions thereof by steam distilling the carbon disulfide therefrom at a temperature in the range of 120 to 159° C. and at the corresponding steam pressure, and more particularly to such a process wherein the carbon disulfide solution of the sulfur is prepared by leaching elemental-sulfur-bearing ore or other crude material with carbon disulfide and separating the resulting extract phase or solution.

Sulfur is a very important and critical chemical material. Large amounts thereof are present in elemental form in certain volcanic ores, and various methods have been proposed heretofore for recovering this elemental sulfur. Some of these involve the extraction of the sulfur therefrom using carbon disulfide as a solvent; and recovering the sulfur from the resulting solution by crystallization of the sulfur, or spray drying the carbon disulfide therefrom. However, these processes leave much to be desired from the commercial viewpoint, especially as to the recovery of the last traces of the very expensive carbon disulfide solvent. The art is confronted with the problem of recovering the elemental sulfur from such ores or analogous materials in an economic and commerically interesting manner.

It has been found in accordance with the invention that elemental sulfur can be recovered in a highly efficient and economical manner from carbon disulfide solutions thereof by steam distilling the carbon disulfide therefrom at a temperature in the range of 120 to 159° C. and at the corresponding saturated steam pressure.

The objects achieved in accordance with the invention, as described herein, include the provision of a process for recovering elemental sulfur from a carbon disulfide solution thereof by steam distilling the carbon disulfide therefrom at a temperature in the range of 120 to 159° C. and at the corresponding steam pressure; the provision of such a process wherein the distillation is carried out at a temperature in the range of 150 to 155° C. and a pressure of seven atmospheres; the provision of such a process wherein a mixture of water and molten sulfur is withdrawn as still bottoms, and water is separated therefrom; the provision of such a process wherein the carbon disulfide solution of sulfur is obtained by extracting ground mineral material containing elemental sulfur with carbon disulfide, and recovering occluded carbon disulfide from the spent mineral material and reusing it in the process; and other objects which will be apparent as details or embodiments of the invention are set forth hereinafter.

The attached drawing illustrates the invention diagrammatically.

In order to facilitate a clear understanding of the invention, the following preferred specific embodiments are described in detail.

*Example 1*

Referring to the accompanying drawing, the finely divided elemental-sulfur-bearing ore is introduced into extractor 1 via line 2 and contacted with carbon disulfide introduced thereinto via line 3 from tank 4. The resulting carbon disulfide solution of sulfur is passed therefrom via line 6 to distillation column 7 wherein it is steam distilled at about 150 to 155° C. and seven atmospheres pressure; steam being introduced thereinto via line 8. Carbon disulfide and water vapors are passed therefrom via line 22 to condenser 17, wherein they are condensed, and the resulting liquid is passed therefrom via line 18 to separator 19. Water is separated from the carbon disulfide and passed to storage via line 20. Carbon disulfide is passed therefrom via line 21 to tank 4; and additional or make-up carbon disulfide may be added thereto via line 5.

Spent ore and occluded carbon disulfide are passed from extractor 1 via line 12 to stripper 13, wherein carbon disulfide is removed therefrom by means of hot water introduced thereinto via line 14. Spent or is removed therefrom via line 15 and discarded. Carbon disulfide and water vapors are passed therefrom via line 16 to a second condenser 17a where they are condensed and the condensate is passed to separator 19 via line 18a.

Molten sulfur and liquid water bottoms are passed from column 7 via line 9 to separator 10 wherein water is separated and withdrawn and passed to storage via line 23. The remaining sulfur is removed therefrom via line 11 and passed to product storage.

The ore or analogous raw material should contain from 5 to 99% of elemental sulfur, desirably 15 to 99%. The lower economic limit is dependent upon such factors as the cost of mining and crushing the crude ore, but the process can operate with almost any concentration of sulfur. The extraction step may be carried out at elevated temperatures below the boiling point of the carbon disulfide. At atmospheric pressure this solvent boils at about 56° C., and at this temperature a saturated solution therein contains about 66% by weight sulfur; in other words, 100 parts by weight of the carbon disulfide dissolves about 180 parts by weight of sulfur. Somewhat lower extraction temperatures may be more convenient, e. g. 30 to 50° C., preferably 40 to 48° C. Elevated pressures may be employed if higher extraction temperatures are desired. The extraction may be carried out under a blanket or seal of liquid water, for instance as described in the U. S. Patents 1,963,921 and 2,888,190.

The distillation column may be of the tray type, e. g. of 10 to 30 trays, preferably 20. The feed thereto may be introduced near the top. The carbon disulfide and water vapors are taken off as overhead, and the molten sulfur and liquid water are taken off as bottoms. The still may be provided with the usual regulating device to control the temperature and pressure, so that the distillation temperature is in the range of 120 to 159° C. and the pressure is the corresponding steam pressure.

The carbon disulfide and water form separate layers in separator 19, the water layer being the upper layer. The water separated therefrom contains a small amount of carbon disulfide and it is passed to storage and reused in the process. The liquid sulfur and water form separate layers in separator 10, the water being in the upper layer. The water separated therefrom is passed to storage and reused in the process. If desired, the molten sulfur may be passed via line 11 into molds wherein it may be cooled in block form.

A number of separators analogous to separator 19 may be used, arranged in a parallel relationship, in order to allow ample time for the formation of the layers therein. Alternatively, centrifugal or equivalent separators may be used therefor, as well as for separator 10.

Generally, the process is most efficient from the viewpoint of steam economy at the higher temperatures; however, the temperature of about 159° C. should not be exceeded, inasmuch as temperatures which are even a few tenths degree higher cause the sulfur to undergo a transition to a form which is extremely viscous and renders the column inoperable. The process is operative at any temperature above the melting point of sulfur; however, from the viewpoint of steam economy, temperatures of at least about 150° C. are preferred.

It is indeed surprising that elemental sulfur can be recovered from carbon disulfide solutions thereof in such an economical and convenient manner in accordance with the invention; especially, when compared with the heretofore suggested crystallization or spray drying techniques and their very cumbersome methods of removing the solidified sulfur.

In view of the foregoing discussions, variations and modifications of the invention will be apparent to one skilled in the art, and it is intended to include within the invention all such variations and modifications except as do not come within the scope of the appended claims.

I claim:

1. A process for recovering sulfur from carbon disulfide solutions thereof which comprises steam distilling the carbon disulfide therefrom at a temperature in the range of 120 to 159° C. and the corresponding steam pressure.

2. A process of claim 1 wherein the temperature is in the range of 150 to 155° C. and the pressure is seven atmospheres.

3. A process of claim 2 wherein a mixture of water and molten sulfur is obtained as the still residue, and water is separated therefrom.

4. In a process wherein a carbon disulfide solution of sulfur is obtained by extracting ground mineral material containing elemental sulfur with carbon disulfide, and occluded carbon disulfide is steam stripped from the spent mineral material and reused in the process, the improvement which comprises recovering the sulfur from said solution by steam distilling the carbon disulfide therefrom at a temperature in the range of 120 to 159° C. and the corresponding steam pressure.

5. A process of claim 4 wherein the temperature is in the range of 150 to 155° C. and the pressure is seven atmospheres.

6. A process of claim 5 wherein a mixture of water and molten sulfur is obtained as the still residue, and water is separated therefrom.

References Cited in the file of this patent

UNITED STATES PATENTS

| | | |
|---|---|---|
| 166,279 | Johnson | Aug. 3, 1875 |
| 450,501 | Whiting et al. | Apr. 14, 1891 |
| 484,963 | Hickey | Oct. 25, 1892 |
| 1,672,924 | Bacon | June 12, 1928 |
| 1,963,921 | Nagelvoort | June 19, 1934 |
| 2,088,190 | du Pont | July 27, 1937 |
| 2,316,673 | McDonald | Apr. 13, 1943 |
| 2,459,764 | Yeiser | Jan. 18, 1949 |